US011208173B2

(12) United States Patent
Olszewski et al.

(10) Patent No.: US 11,208,173 B2
(45) Date of Patent: Dec. 28, 2021

(54) TOWING ELEMENT ASSEMBLY, A LOCKING MECHANISM ASSEMBLY AND A FLEXIBLE TOWING DEVICE FOR SINGLE-TRACK VEHICLES COMPRISING SUCH A TOWING ELEMENT ASSEMBLY AND SUCH A LOCKING MECHANISM ASSEMBLY

(71) Applicants: Michal Olszewski, Warsaw (PL); 2Riders Prosta Spolka Akcyjna, Bialystok (PL)

(72) Inventors: Michal Olszewski, Warsaw (PL); Adam Tomaszuk, Bialystok (PL); Jaroslaw Szusta, Bialystok (PL); Lukasz Derpenski, Bialystok (PL)

(73) Assignees: 2RIDERS PROSTA SPOLKA AKCYJNA, Bialystok (PL); Michal Olszewski, Warsaw (PL)

( * ) Notice: Subject to any disclaimer, the term of this patent is extended or adjusted under 35 U.S.C. 154(b) by 190 days.

(21) Appl. No.: 16/413,189

(22) Filed: May 15, 2019

(65) Prior Publication Data

US 2019/0351968 A1 Nov. 21, 2019

(30) Foreign Application Priority Data

May 17, 2018 (PL) ...................................... P-425599

(51) Int. Cl.
*B62K 27/12* (2006.01)
*B62J 11/20* (2020.01)
*B62J 27/00* (2020.01)

(52) U.S. Cl.
CPC ............... *B62K 27/12* (2013.01); *B62J 27/00* (2013.01); *B62J 11/20* (2020.02)

(58) Field of Classification Search
CPC ...... B62K 27/12; B62K 13/02; B62K 13/025; B62J 11/20; B60D 2001/003; B60D 1/185; B60D 1/187
(Continued)

(56) References Cited

U.S. PATENT DOCUMENTS 581,309 A * 4/1897 Savell ...................... B62J 99/00
280/292
675,453 A * 6/1901 Sturgess ................. B62K 27/12
280/292
(Continued)

FOREIGN PATENT DOCUMENTS

DE 20021380 U1 * 8/2001 ............. B62K 13/02
DE 102014112172 A1 * 3/2016 ............. B62K 27/12
(Continued)

*Primary Examiner* — Minnah L Seoh
*Assistant Examiner* — Myles A Harris
(74) *Attorney, Agent, or Firm* — Seed Intellectual Property Law Group LLP

(57) ABSTRACT

A flexible towing device for single-track vehicles, comprising a towing element adapted for mounting on a first of single-track vehicles and comprising a flexible towing element and a lock attached to one of the ends of the flexible towing element, a locking mechanism assembly adapted for mounting on a second of single-track vehicles and comprising a first portion of the body comprising a half-seat, a second portion of the body comprising a half-seat, which half-seats of the first and the second portion, respectively, form a seat for detachable coupling of the lock of the towing element assembly, wherein the lock of the towing element assembly is releasable from the seat of the locking element mechanism assembly following applying a release force to the lock. A towing element assembly and a locking mechanism assembly for use in the flexible towing device for single-track vehicles.

18 Claims, 6 Drawing Sheets

(58) Field of Classification Search
USPC .................................. 280/204, 480, 481
See application file for complete search history.

(56) References Cited

U.S. PATENT DOCUMENTS

| | | | | |
|---|---|---|---|---|
| 6,036,215 A | * | 3/2000 | Bruner | B62K 13/08 |
| | | | | 280/292 |
| 7,334,808 B2 | * | 2/2008 | Fatzinger | B63B 34/67 |
| | | | | 280/292 |
| 7,644,945 B1 | * | 1/2010 | Kourkoumelis | F16B 2/08 |
| | | | | 280/293 |
| 2009/0091100 A1 | * | 4/2009 | Barraza | B60D 1/18 |
| | | | | 280/292 |
| 2016/0023712 A1 | * | 1/2016 | Petit-Frere | B62K 13/025 |
| | | | | 280/292 |
| 2020/0398621 A1 | * | 12/2020 | Landis | B60D 1/187 |

FOREIGN PATENT DOCUMENTS

| | | | | |
|---|---|---|---|---|
| FR | 2507145 A1 | * | 12/1982 | ............. B62K 27/12 |
| GB | 2289878 A | * | 12/1995 | ............. B60D 1/145 |
| GB | 2335948 A | * | 10/1999 | ............. B62J 27/00 |
| WO | WO-2011081534 A1 | * | 7/2011 | ............. B60D 1/182 |
| WO | WO-2017178934 A1 | * | 10/2017 | ............. F16G 13/18 |

\* cited by examiner

TOWING ELEMENT ASSEMBLY, A LOCKING MECHANISM ASSEMBLY AND A FLEXIBLE TOWING DEVICE FOR SINGLE-TRACK VEHICLES COMPRISING SUCH A TOWING ELEMENT ASSEMBLY AND SUCH A LOCKING MECHANISM ASSEMBLY

FIELD OF THE INVENTION

The present invention relates to a towing element assembly for a flexible towing device for single-track vehicles, a locking mechanism assembly for a flexible towing device for single-track vehicles and a flexible towing device for single-track vehicles comprising such a towing element assembly and such a locking mechanism assembly. The flexible towing device according to the invention for single-track vehicles is used in the movement of two single-track vehicles interconnected by means of the flexible towing device, especially bicycles, preferably a pair of bicycles, wherein the bike in the front is ridden by an adult, and the bike in the back is ridden by a child.

BACKGROUND OF THE INVENTION

To instil health-oriented attitudes in children, they should be encouraged to follow a health-oriented lifestyle. One of such attitudes involves developing in children the need to be physically active. One of the physical activities a child should be encouraged to do since young age is bike riding. Riding longer distances with a bigger load might be more attractive to parents, however, children are more interested in riding their bicycles at high speeds. However, riding up even small hills or riding longer distances poses a difficulty to children and may have a discouraging effect on them.

To prevent this, especially when a child is tired or while travelling back to the starting point, or when riding uphill, a towing device can be used. A commonly used towing device is a bar for towing children's bikes, also known as a bicycle tow bar.

A tow bar is suitable for small children, typically aged 3-5, not yet able to properly control a bicycle. Such a towing device has the structure of a tow bar or rod. One end of the structure of the tow bar is articulately attached to the back portion of the frame of the parent's bike, usually by means of a grip under the saddle. The structure of the tow bar is able to move rockingly horizontally relative to the parent's bike but is not able to move vertically relative to the parent's bike. On the other side, the structure of the tow bar is attached to the front part of the child's bike such that while riding, the front wheel of the child's bike is elevated above the ground. The structure of the tow bar is single-point mounted to the child's bike to the frame right under the handlebars or, more commonly, double-point mounted under the handlebars and to the front fork or the front wheel axle. In such a case, a child has little control of their bicycle. When connected by means of a tow bar to the parent's bike, the front wheel of the child's bike is elevated, and the child follows the parent's bike practically without any effort.

The problem with bicycle tow bars is that as much as they are suitable for children who can't ride a bicycle or whose riding skills are inadequate, they are unsuitable for children who can ride a bicycle well. Such children appreciate the benefits of autonomous bike control and, just as with bikes having side rear wheels, they find riding a bike attached to the parent's bike by means of a tow bar equally unattractive. Cases when children lose their balance are relatively rare.

Nevertheless, there is still a need to provide appropriate safety measures and minimize the effects of falls both for children and parents. Thus, said bicycle tow bar excessively limits a child's ability to control a bike, preventing him or her from enjoying riding it and from developing bike riding skills. In addition, said bicycle tow bar is characterized by providing a highly rigid connection between the parent's and the child's bikes. Consequently, with a child riding a bike in an unstable manner, making movements aimed at keeping his or her balance, the rigidity of the tow bar disturbs these movements, causing an undesired disturbance to the child's riding. Such a disturbance hampers the balancing movements, resulting in a child swaying strongly and even falling off a bike. Another problem of prior-art tow bars is that a child may not keep the right position on a towed bike, for example out of laziness or fatigue. That is, a child riding such a bike may tilt to the right or left side. In such a case, the tow bar is subjected to very strong torsional forces, which may damage it while riding, necessitating its repair or replacement and, in extreme cases, causing a child to fall together with a bike. During a typical family bike ride, children aged 6-8 are substantially capable of covering the entire route without help, except for certain parts of it, especially on the way back. For most of the time, the tow bar is not needed and so its high weight, large size and a troublesome method of attaching and detaching it pose a significant difficulty to the parent. A tow bar won't be released in an emergency wherein, for example, a child partially slides off his or her bike and rubs his or her body against the ground until the interconnected bikes are stopped by the parent or the child lets go off his or her bike. In such cases, the tractive effort of the parent amplifies the child's injuries. However, the parent's fall inevitably causes the child to fall too and suffer injuries.

Therefore, there is a need for a towing device for single track vehicles that at least reduces and, preferably, eliminates the flaws and solve the problems of the prior-art towing devices for single track vehicles, especially such as those described above.

SUMMARY OF THE INVENTION

To satisfy this need, the inventor has created the following invention.

In one of the aspects, the present invention relates to a towing element assembly for a flexible towing device for single-track vehicles, comprising a towing element assembly and a locking mechanism assembly. The towing element assembly according to the invention is adapted for mounting on a single-track vehicle and comprises a flexible towing element, a lock for detachable coupling in the locking mechanism assembly, wherein the lock is attached to one of the ends of the flexible towing element, whereby the lock is releasable from locking mechanism assembly when a release force is applied to the lock.

Preferably, the lock of the towing element assembly comprises an adjusting mechanism for setting and/or adjusting the release force.

Preferably, the release force of the element assembly is constant across the entire angular range of operation of the lock.

Preferably, the release force is variable along with the operational angle of the lock and changes from a first release force directed substantially along the main axis to a second release force directed along the lateral axis lateral to the main axis, wherein the second release force is smaller than the first release force or the second release force is equal to substantially zero.

Preferably, the release force substantially comprises a first release force directed toward the locking mechanism assembly falling within an angular range between the main axis and the lateral axis of 0° to 80°, preferably 0° to 70°, more preferably 0° to 65° and most preferably 0° to 35°, and a second release force out of the angular range of the first release force, wherein the second release force is smaller than the first release force or the second release force is equal substantially zero.

Preferably, the lock of the towing element comprises a component having a shape selected from among a hemisphere, a ball, a disc, a half cone, a cone, a double cone, a bipyramid, a flat bar with recesses, for detachable fitting in the locking mechanism assembly.

Preferably, the towing element assembly comprises also a winding mechanism for winding and/or unwinding the flexible towing element for adjusting the length of the flexible towing element and/or winding it up following releasing the towing element assembly from the locking mechanism assembly.

Preferably, the towing element assembly comprises also a bracket for mounting this assembly on a single-track vehicle.

In a further aspect, the present invention relates to a locking mechanism assembly for a flexible towing device for single-track vehicles, wherein the flexible towing device comprises a towing element assembly and a locking mechanism assembly. The locking mechanism assembly according to the invention is adapted for mounting on a single-track vehicle and comprises a first portion of the body comprising a half-seat, a second portion of the body comprising a half-seat, wherein half-seats of the first and the second portion of the body form a seat for detachable coupling of the towing element assembly, wherein the towing element assembly is releasable from the seat of the locking mechanism when a release force F is applied to the towing element assembly.

Preferably, the locking mechanism assembly comprises an adjusting mechanism for setting and/or adjusting the release force F.

Preferably, the release force is constant across the entire angular range of operation of the seat.

Preferably, the release force is variable along with the angle relative to the seat and changes from a first release force directed relative to the locking mechanism assembly substantially along the main axis, to a second release force directed along the lateral axis lateral to the main axis, wherein the second release force is smaller than the first release force or the second release force is equal substantially zero.

Preferably, the first and the second portion of the body of the locking mechanism assembly is each shaped like a teaspoon and comprises a half-seat in the form of a recess, wherein the first and the second portion of the body each comprises a notch directed laterally along the lateral axis such that the release force has a maximum value substantially in the direction of the main axis and a minimum value in the direction of the lateral axis.

Preferably, for each notch the lateral axis of the locking mechanism assembly is located independently relative to the main axis at an angle ranging from 0° to 80°, preferably from 0° to 70°, more preferably from 0° to 65°, and most preferably from 0° to 35°.

Preferably, the release force comprises a first release force directed toward the locking mechanism assembly within an angular range between the man axis and the lateral axis of 0° to 80°, preferably 0° to 70°, more preferably 0° to 65° and most preferably 0° to 35°, and a second release force out of the angular range of the first release force, wherein the second release force is smaller than the first release force or the second release force is equal substantially zero.

Preferably, the first and the second portion of the body of the locking mechanism is each shaped like a flat bar with a rounded end and comprises a half-seat in the form of a recess extending along such a rounded end to form a seat extending along the rounded end of the first and the second portion of the body, and notches on the opposite the first and the second portion of the body such that the notches of the neighbouring parts of the body form openings, wherein the release force within the seat is constant and constitutes a first release force, and in openings it constitutes a second release force equal to zero for substantially free releasing of the towing element assembly.

Preferably, in angular positions in the seat of the locking mechanism assembly for which the release force is a second release force substantially equal to zero, are contact sensors for substantially free releasing of the towing element assembly.

Preferably, the locking mechanism assembly comprises also a gyroscope for releasing the towing element assembly during a fall of a single-track vehicle on which the locking mechanism is mounted.

Preferably, the locking mechanism assembly comprises also a bracket for mounting this assembly on a single-track vehicle.

In yet another aspect, the present invention relates to a flexible towing device for single-track vehicles. The flexible towing device according to the invention comprises a towing element assembly adapted for mounting on a first single-track vehicle and comprising a flexible towing element and a lock attached to one of the ends of the flexible towing element, and a locking mechanism assembly adapted for mounting on a second single-track vehicle and comprising a first and second portion of the body comprising a half-seat, a second portion of the body comprising a half-seat. The half-seats of, respectively, the first and the second portion of the body form a seat for detachable coupling of the lock of the towing element assembly. The lock of the towing element assembly is releasable from the seat of the locking element mechanism assembly when the release force is applied on the lock.

Preferably, the lock of the towing element assembly comprises an adjusting mechanism for setting and/or adjusting the release force.

Preferably, the locking mechanism assembly comprises an adjusting mechanism for setting and/or adjusting the release force.

Preferably, the release force is constant across the entire angular range of operation of the seat of the locking mechanism assembly.

Preferably, the release force is variable along with the angle of applying the release force on the lock relative to the seat and changes from a first release force directed relative to the locking mechanism assembly substantially along the main axis, to a second release force directed along the lateral axis lateral to the main axis, wherein the second release force is smaller than the first release force or the second release force is equal substantially zero.

Preferably, the first and the second portion of the body of the locking mechanism assembly is each shaped like a teaspoon and comprises a half-seat in the form of a recess, wherein the first and the second portion of the body each comprises a protrusion directed substantially along the main axis of the locking mechanism assembly and an arched notch toward the lateral direction along the lateral axis of the locking mechanism assembly such that the release force has a maximum value substantially in the direction of the main axis and a minimum value in the direction of the lateral axis.

Preferably, for each notch the lateral axis of the locking mechanism assembly is located independently relative to the main axis of the locking mechanism assembly at an angle ranging from 0° to 80°, preferably from 0° to 70°, more preferably from 0° to 65°, and most preferably from 0° to 35°.

Preferably, the first and the second portion of the body of the locking mechanism is each shaped like a flat bar with a rounded end and comprises a half-seat in the form of a recess extending along such rounded end to form a seat extending along the rounded end of the first and the second portion of the body, and notches on the first and the second portion of the body such that the notches of the neighbouring parts of the body form openings, wherein the release force within the seat is constant and constitutes a first release force, while in openings it constitutes a second release force substantially equal to zero for substantially free releasing of the lock of the towing element assembly.

Preferably, in angular positions in the seat of the locking mechanism assembly for which the release force constitutes a second release force equal to substantially zero, there are contact sensors for substantially free releasing of the lock of the towing element assembly from the seat of the locking mechanism assembly.

Preferably, the locking mechanism assembly comprises a gyroscope for releasing the lock of the towing element assembly during a fall of a single-track vehicle on which the locking mechanism assembly is mounted.

Preferably, the locking mechanism assembly comprises also a bracket for mounting this assembly on a single-track vehicle.

Preferably, the lock of the towing element assembly comprises a component having a shape selected from among a hemisphere, a ball, a disc, a half-cone, a cone, a double cone, a bipyramid, a flat bar with recesses, while the half-seats of, respectively, the first and the second portion have a shape complementary to the lock such that the lock is rotatable and/or movable substantially freely in the seat of the locking mechanism assembly.

Preferably, the towing element assembly comprises also a winding mechanism for winding and/or unwinding a flexible towing element for adjusting the length of the flexible towing element and/or winding it up following releasing the lock of the towing element assembly from the seat of the locking mechanism assembly.

Preferably, the towing element assembly comprises also a bracket for mounting this assembly on a single-track vehicle.

The present invention provides a flexible towing device for single-track vehicles providing a child with a greater freedom of movement on a bike ridden after the parent's bike. The flexible towing device for single-track vehicles allows a child to follow the parent's bike within a close range therefrom, determined by the length of the flexible towing device. A child rides a bike within this area freely, practically independently of the parent. However, when a child is riding a bike within a distance from the parent's bike determined by the length of the flexible towing device, especially after the parent's bike, the child is using the parent's tractive effort, thus utilizing the towing function of the towing device according to the invention for single-track vehicles. Consequently, there are no other factors within this range that would disturb a child's riding, and the tractive effort has a stabilizing effect on his or her riding. A child can freely balance his or her bike thus mastering the riding technique while enjoying themselves. In addition, said range is free from disturbances caused by the towing device that might knock a child out of balance or cause it to fall off a bike. In the case of the flexible towing device according to the invention for single-track vehicles the towing device is prevented from transmitting torsion forces. Hence, a child is prevented from riding their bike in an incorrect position, for example tilted to one side. The towing device according to the invention for single-track vehicles forces a child to ride their bike in correct position. In the case of occurrence of an event resulting in generation of a large force acting on a child's bike through the flexible towing device according to the invention, the device is released, and the child's bike is disconnected from the parent's bike to avoid a dangerous situation or a fall. Such event is, for example, a sudden decrease in the speed of a child's bike relative to the speed of the parent's bike. A decrease in the speed of a child's bike does not cause a strong disturbance to his or her balance or result in their fall. If a child falls, the flexible towing device is disconnected. The child does not be dragged behind the parent's bike until the parent stops and, consequently, the child's injuries would practically be no greater than if suffered during riding a bike independently of the parent.

SHORT DESCRIPTION OF THE FIGURES

The invention is now described in detail with reference to the attached drawings wherein.

DETAILED DESCRIPTION OF THE INVENTION

The flexible towing device for single-track vehicles illustrated in the attached figures includes reference numbers of individual components, wherein the components corresponding to one another in terms of their design and/or function are marked with the same reference numbers.

Figure 1:
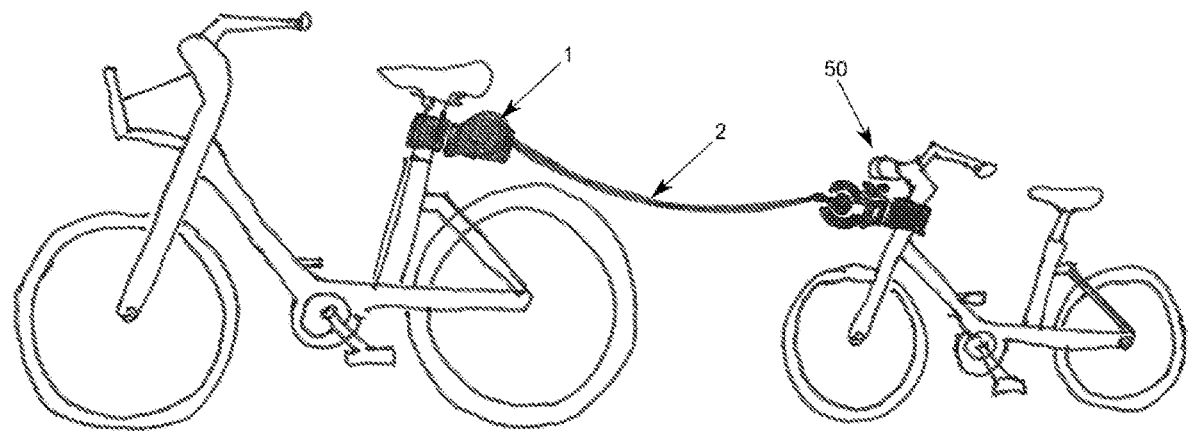
FIG. 1 illustrates an arrangement of a leading single-track vehicle and a led single-track vehicle interconnected by means of the flexible towing device according to the invention for single-track vehicles.

The flexible towing device according to the invention for single-track vehicles is used for interconnecting two single-track vehicles. As shown in FIG. 1, one of the single-track vehicles is a leading vehicle, which, in a pair of interconnected single-track vehicles, moves as the first one, together with the second single-track vehicle, being a led vehicle, which, in principle, follows the leading vehicle. The single-track vehicle is, without limitations, a bicycle. The leading single-track vehicle is, without limitations, an adult's bicycle, ridden by an adult, preferably a parent. The led vehicle is, without limitations, a children's bike ridden by a child, preferably a child having sufficient bike riding skills.

The flexible towing device according to the invention for single-track vehicles comprises a towing element assembly 1 and a locking mechanism assembly 50.

The towing element assembly 1 comprises a flexible towing element 2 having a length, being an element interconnecting two single-track vehicles and determining the scope of movement within which two single-track vehicles are movable relative to each other. Said scope is determined by the length of the flexible towing element 2. The length of the flexible towing element 2 is selected such that the scope of movement determined by it allows single-track vehicles to be ridden freely relative to each other. The length of the flexible towing element 2 is not excessively long to ensure that the scope of movement between two single-track vehicles is not too big. The length of the flexible towing element 2 ranges from 0.7 to 5 m, preferably from 2 to 3.5 m. Thus, when single-track vehicles are moving relative to each other within the scope of the movement, within the length of the flexible towing element 2, said flexible towing element 2 does not transfer any forces between the first and the second single-track vehicle. However, when single-track vehicles are moving relative to each other within a distance equal to the length of the flexible towing element 2 and, substantially one behind the other, said flexible towing element 2 is tightened and transfers the towing force from the leading single-track vehicle to the led single-track vehicle. However, in the above-described arrangement of single-track vehicles interconnected by means of the flexible towing device according to the invention, said towing device does not upset the balance of any of the single-track vehicles while mobile. In the case where the led single-track vehicle is ridden next to the leading single-track vehicle within the scope of the movement, the flexible towing element 2 does not pose a threat of knocking at least one of the single-track vehicles out of balance or a threat of it falling. In addition, the flexible towing element 2 does not pose such threat also in a situation where the led single-track vehicle overtakes the leading vehicle within the scope of the movement.

The towing element assembly 1 comprises also a lock 3, 3" attached to one of the ends of the flexible towing element 2. The lock 3" is adapted for detachable coupling in the locking mechanism assembly 50 of the flexible towing device according to the invention for single-track vehicles.

Figure 8:
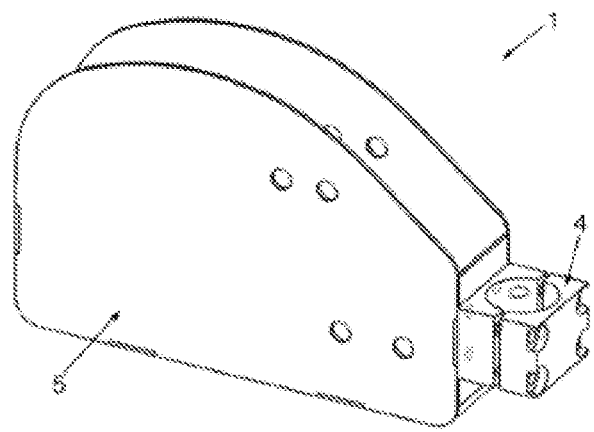
FIG. 8 illustrates a perspective view of the winding mechanism according to a preferred embodiment of the towing element assembly.

The towing element assembly 1 is adapted for mounting on one of the single-track vehicles. In one of the embodiments, the mounting of the towing element 1 on a single-track vehicle is effected by means of tying the flexible towing element 2 to said single-track vehicle. In another embodiment, the towing element assembly 1 comprises a grip 4 for mounting the towing element assembly 1 on a single-track vehicle. In one of the embodiments, the grip 4 constitutes a bracket for mounting the towing element assembly 1 on a single-track vehicle. The grip 4 is attached to the flexible towing element 2 on the opposite side of the lock 3, 3". In one of the preferred embodiments, the towing element assembly 1 comprises a winding mechanism 5 for winding or unwinding the flexible towing element 2. The winding mechanism 5 allows adjusting the length of the flexible towing mechanism 2 thus adjusting the above-mentioned scope of movement of single-track vehicles relative to each other. Alternatively or additionally, the winding mechanism 5 allows automatic winding of the flexible towing element 2 of the towing element 1 following its releasing from the locking mechanism 50. In yet another preferred embodiment, the winding mechanism 5 continually keeps the flexible towing element 2 slightly tightened between single-track vehicles interconnected by means of the flexible towing device 2 according to the invention. In this embodiment, the length of the flexible towing element 2 is adjusted as bikes are moving, whereby the functionality of releasing following application of the force F is kept, as is described in detail below. Moreover, keeping the flexible towing element 2 slightly tightened prevents said flexible towing element 2 from falling, thus increasing the safety of use of the flexible towing device according to the invention for single-track vehicles, as, for example, the flexible towing element does not hang loose between single-track vehicles, does not drag on the ground and there is no threat of the flexible towing element 2 getting into the wheel of at least one of single-track vehicles. In a preferred embodiment, the winding mechanism 5 comprises a grip 4 for mounting said assembly 5 on a single-track vehicle. In one of such preferred embodiments, the grip 4 constitutes a bracket for mounting the winding mechanism on a single-track vehicle, as shown in FIG. 8. The grip 4 is located on the winding mechanism 5 on its opposite side relative to the flexible towing element 2.

The locking mechanism assembly 50 comprises a seat 51, 51', 51" adapted for releasable receiving the lock 3, 3" of the towing element assembly 1. This means that, if necessary, the lock 3, 3" of the towing element assembly 1 is released from the seat 51, 51', 51" of the locking mechanism assembly 50.

Figure 2:
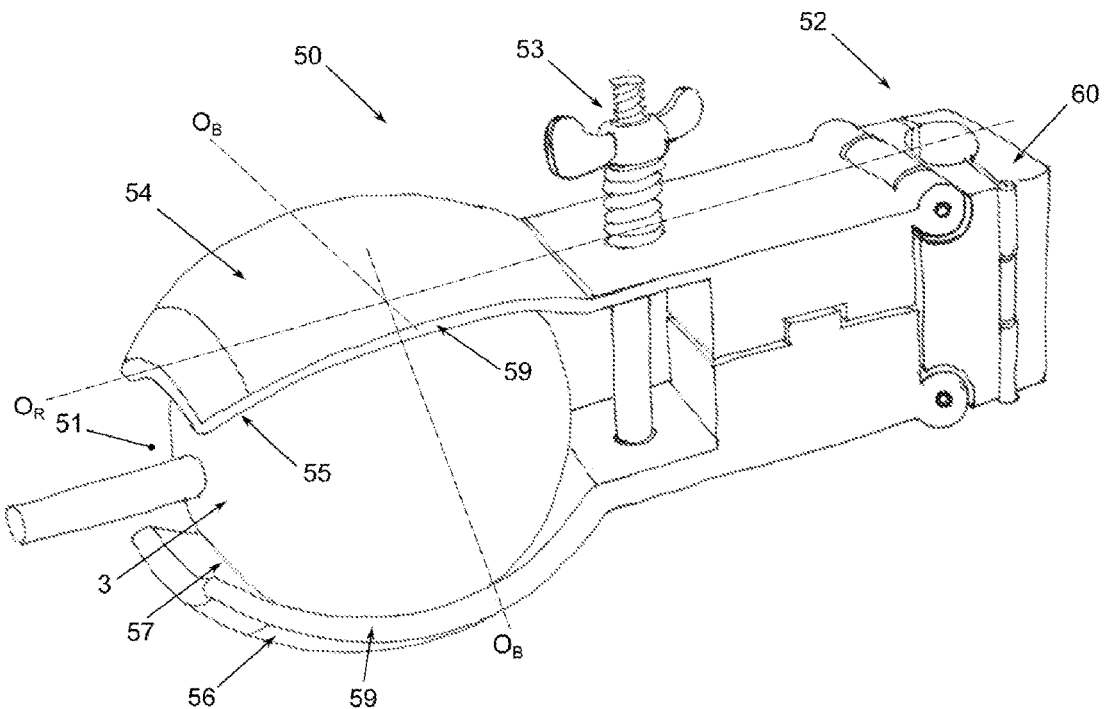
FIG. 2 illustrates a perspective view of the locking mechanism assembly together with the lock of the towing element assembly according to one of the embodiments of the flexible towing device according to the invention for single-track vehicles.
Figure 3:
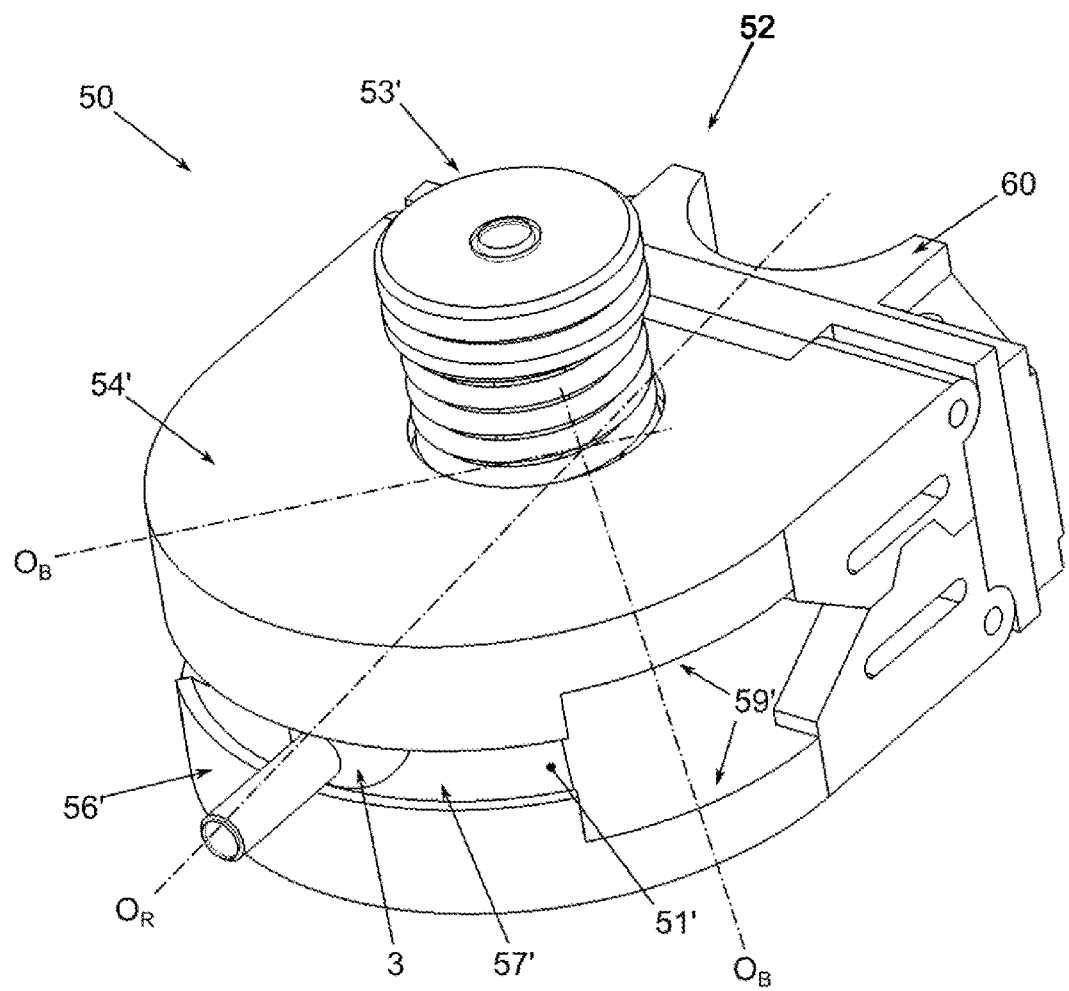
FIG. 3 illustrates a perspective view of the locking mechanism assembly together with the lock of the towing element assembly according to another embodiment of the flexible towing device according to the invention for single-track vehicles.
Figure 4:
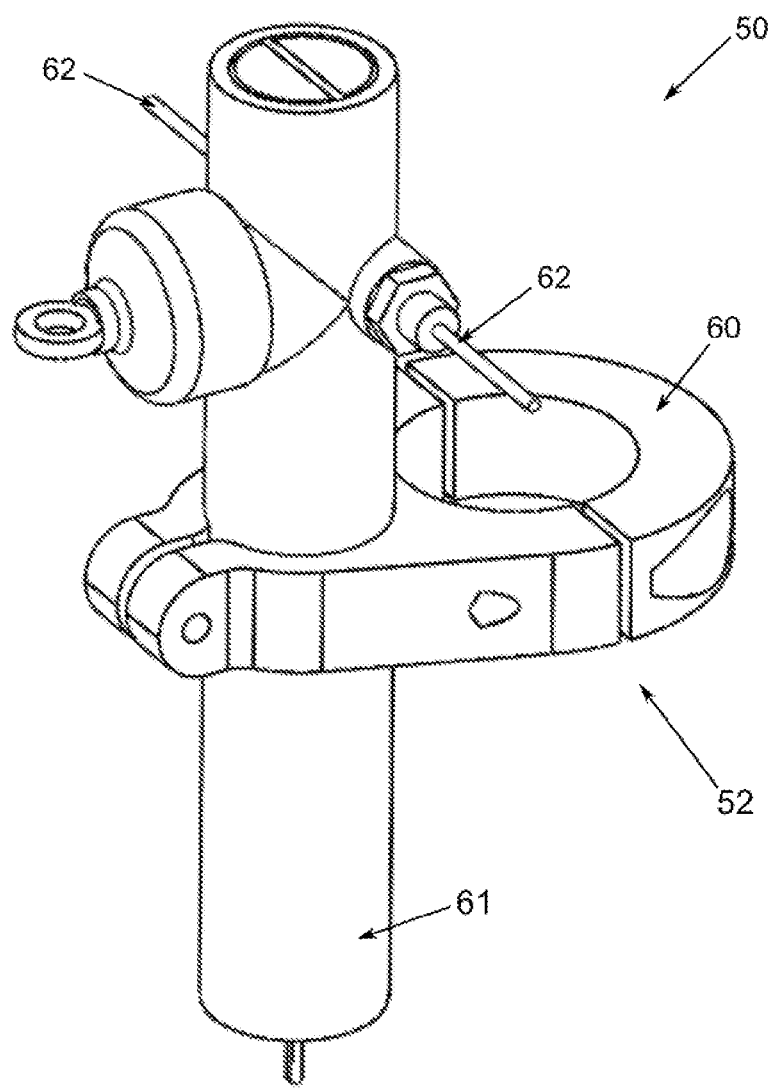
FIG. 4 illustrates a perspective view of the locking mechanism assembly together with the lock of the towing element assembly according to yet another embodiment of the flexible towing device according to the invention for single-track vehicles.

The locking mechanism assembly 51, 51', 51" is adapted for mounting on a second one of single-track vehicles. In one of the embodiments, the locking mechanism assembly 50 comprises a grip 52 for mounting the locking mechanism assembly 50 on a single-track vehicle. In one of the embodiments, the grip 52 constitutes a bracket 60, as shown in FIGS. 2 to 4, for mounting the locking mechanism assembly 50 on a single-track vehicle.

Generally, the towing element assembly 1 is mounted on a led single-track vehicle, whereas the locking mechanism assembly 50 is mounted on a leading single-track vehicle. However, the assemblies 1, 50 of the flexible towing device according to the invention can be installed on single-track vehicles in a reverse configuration. Namely, the towing element assembly 1 is mounted on a leading single-track vehicle, whereas the locking mechanism assembly 50 is mounted on a lead single-track vehicle. One of the towing element assembly 1 and the locking mechanism assembly 50 is mounted on a leading single-track vehicle in a spot ensuring a strong and stable connection of this assembly 1, 50 to the vehicle and allowing unhindered riding of such a vehicle. Preferably, but without limitations, if the single-track vehicle is a bicycle, the selected assembly 1, 50 is mounted on the frame of the bicycle under the saddle. The second of the towing element assembly 1 and the locking mechanism assembly 50 is mounted on a lead single-track vehicle in a spot ensuring a strong and stable connection of this assembly 1, 50 to the vehicle and allowing unhindered riding of such a vehicle. Preferably, but without limitations, when a led single-track vehicle is a bicycle, the selected assembly 1, 50 is mounted to the frame of the bicycle within the handlebar, preferably on the stem of the handlebar to which rotatable attached is the fork of the front wheel. Alternatively, the towing element assembly 1 and/or the locking mechanism assembly 50, respectively, is integrated with the frame of a specific single-track vehicle. For example, but without limitations, the towing element assembly 1 and/or the locking mechanism assembly, respectively, is welded to the frame of a specific single-track vehicle at a spot, as indicated above by way of example.

At least one of the lock 3, 3" of the towing element assembly 1 and the seat 51, 51', 51" of the locking mechanism 50 is configured such that following applying a predefined force F to the lock 3, 3" it is released from the seat 51, 51',51". The release force F is applied to the lock 3, 3" by means of the flexible towing element 2. The release force F is a force acting on the lock 3, 3" of the towing element assembly 1 directed from the seat 51, 51', 51" of the locking mechanism assembly 50 which causes decoupling of the lock 3, 3" and its sliding out of the seat 51, 51', 51". The release force F is generated by an event acting substantially directly on at least one of the components of the towing element assembly 1, particularly the flexible towing element 1. One of such events is, for example, an attempt at a sudden and/or firm displacement of one of single-track vehicles beyond the scope of movement defined by the length of the flexible towing element 2 of the towing element assembly 1, resulting, for example, from a sudden decrease in the speed of the led single-track vehicle relative to the leading single-track vehicle or a fall of the led single-track vehicle. In such a case the flexible towing element 2 pulls the lock 3, 3" generating the release force F to act on it and, consequently, a release of the locking mechanism assembly 50 from the seat 51, 51', 51". This happens, for example, when a child riding a bike behind his or her parent suddenly presses the brakes or falls. Another event of this type occurs when an obstacle gets between the leading single-track vehicle and the led single-track vehicle or when the led single-track vehicle overtakes the leading single-track vehicle whose speed for some reason is decreased or which suddenly stops. Such event is particularly probable when single-track vehicles are not moving in line, that is, when the led single-track vehicle is ridden misaligned relative to the leading single-track vehicle or when both single-track vehicles are ridden next to one another. In such a case, the flexible towing element 2 stops on said obstacle and is pulled, thus the release force F acting on the lock 3, 3" is generated and said lock 3, 3" shall be released from the seat 51, 51', 51" of the locking mechanism assembly 50. This occurs, for example, when a child riding a bike behind or next to his or her parent changes direction to omit a pole, a lamp post or a pedestrian on the other side relative to the parent. The jerk, that is, the release force F generated and acting on the lock 3, 3" of the towing element assembly 1 causing it to be released from the seat 51, 51', 51" of the locking mechanism 50 is big enough to disconnect the towing element assembly 1 from the locking mechanism assembly 50 and at the same time small enough not to significantly upset the balance of any of the persons riding the single-track vehicles or cause them to fall. In other words, the jerk disrupts the movement of at least one of the persons riding the single-track vehicles but is small enough to allow such a person to remain in control of their vehicle. This is particularly important in the case of a child riding a bike behind his or her parent. A child's ability to ride a bike is sufficient for him or her to be able to remain in control of his or her bike following a jerk. In addition, as described above, the release force F does not pose a significant threat when a pedestrian is the obstacle. The creator has experimentally proven that the release force F, as described above, falls within the range of between 20 and 800 N, preferably from 50 to 300 N, and most preferably from 60 to 200 N.

As mentioned above, configuration of the release force F in the flexible towing device according to the invention for single-track vehicles is performed on at least one of the lock 3, 3" of the towing element assembly 1 and the seat 51, 51',51" of the locking mechanism assembly 50. The release force F is configured such that following it being applied to the lock 3, 3" as described above, said lock 3, 3" of the towing element assembly 1 is released from the seat 51, 51',51" of the locking mechanism assembly 50. The lock 3, 3" of the towing element 1 comprises an adjusting mechanism for setting and/or adjusting the lock 3, 3" such that it is released from the seat 51, 51', 51" of the locking mechanism assembly 50 following application of the release force F. Similarly, the locking mechanism assembly 50 comprises an adjusting mechanism 53, 53', 53" for setting and/or adjusting the locking mechanism 50 such that the lock 3, 3" of the towing element assembly 1 is released from the seat 51, 51', 51" following application of the release force F. In one of the embodiments of the flexible towing device according to the invention for single-track vehicles the lock 3, 3" of the towing element assembly 1 is equipped with the adjusting mechanism, while the locking mechanism assembly 1 does not comprise any adjusting mechanisms. In such an embodiment setting and/or adjusting the release force F in the flexible towing device according to the invention for single-track vehicles is provided solely by means of the adjusting mechanism of the lock 3, 3" of the towing element assembly. In another embodiment of the flexible towing device according to the invention, the adjusting mechanism assembly 50 is equipped with the adjusting mechanism 53, 53', 53", whereas the lock 3, 3" of the towing element assembly comprises no adjusting mechanisms. In such an embodiment setting and/or adjusting the release force F in the flexible towing device according to the invention for single-track vehicles is provided solely by means of the adjusting mechanism 53, 53', 53" of the locking mechanism assembly 50. In yet another embodiment of the flexible towing device according to the invention for single-track vehicles both the lock 3, 3' and the locking mechanism assembly 50 are each equipped with the adjusting mechanisms 53, 53', 53" of the release force F, respectively. In such an embodiment of the flexible towing device according to the invention for single-track vehicles setting and/or adjusting the release force F is provided by means of the adjusting mechanisms of the lock 3, 3" of the towing element assembly 1 and/or the adjusting mechanism 53, 53', 53" of the locking mechanism assembly 50.

The adjusting mechanism 53, 53',53" for setting and/or adjusting the release force F of the flexible towing device according to the invention for single-track vehicles is realized, for example, but without limitations, mechanically, pneumatically, hydraulically, electrically, magnetically or by means of combination of these methods.

In one of the embodiments of the flexible towing device according to the invention for single-track vehicles, the adjusting mechanism 53, 53', 53" is realized by means of using an elastic material to manufacture the lock 3, 3" of the towing element assembly 1 and the locking mechanism assembly 50, respectively. In such a case both the lock 3, 3" and/or the seat 51, 51', 51" are deformed following application of the release force F, causing decoupling and sliding of the lock 3, 3" of the towing element assembly 1 out of the seat 51, 51', 51" of the locking mechanism assembly 50. The elastic material is, for example, but without limitations, a polymer material, for example, rubber. In such a case, the setpoint of the release force F is permanently factory-set by selecting a material having properties required to release the lock 3, 3" of the towing element assembly 1 from the seat 51, 51', 51" of the locking mechanism assembly 50, as described above.

The mechanical adjusting mechanism 53, 53', 53" is realized, for example, but without limitations, by means of a spring provided in the lock 3, 3" of the towing element assembly 1 and in the locking mechanism assembly 50, respectively, suitable for the mechanism 53, 53', 53". In such a case, the setpoint and/or adjustment of the adjusting mechanism 53, 53', 53" is realized by setting or adjusting the spring load. Furthermore, the setpoint of the release force F of the mechanical adjusting mechanism 53, 53', 53" can be factory-set permanently or can be adjusted as needed by the manufacturer or user of the flexible towing device according to the invention for single-track vehicles.

The pneumatic/hydraulic adjusting mechanism 53, 53', 53" is realized, for example, but without limitations, by means of a pneumatic/hydraulic cylinder provided in the lock 3, 3" of the towing element assembly 1 and in the locking mechanism assembly 50, respectively, suitable for the mechanism 53, 53', 53". In such case, the setpoint and/or adjustment of the adjusting mechanism 53, 53', 53" is realized by setting or adjusting the pressure of a pneumatic/hydraulic medium or the flow of such medium between the connected chambers of the pneumatic/hydraulic cylinder. The setpoint of the release force F of the pneumatic/hydraulic adjusting mechanism 53, 53', 53" can be factory-set permanently or can be adjusted as needed by the manufacturer or user of the flexible towing device according to the invention for single-track vehicles.

The electrical adjusting mechanism 53, 53', 53" is realized, for example, but without limitations, by means of an electrical or electronic system provided in the lock 3, 3" of the towing element assembly 1 and in the locking mechanism assembly 50, respectively, suitable for the mechanism 53, 53', 53". For example, but without limitations, the electrical adjusting mechanism 53, 53', 53" comprises a sensor for detecting the force applied to the lock 3, 3" of the towing element 1 and for generating the sensor signal. The electrical adjusting mechanism 53, 53', 53" comprises execution elements, which, depending on the sensor signal, cause the lock 3, 3" of the assembly to be released from the seat 51, 51',51" of the locking mechanism assembly 50. If the force applied to the lock 3, 3" is equal to or greater than the release force F, the sensor generates a release signal transmitted to the execution elements in response to which signal the execution elements release the lock 3, 3" of the towing element assembly from the seat 51, 51', 51" of the locking mechanism assembly 50. The setpoint of the release force F of the electrical adjusting mechanism 53, 53', 53" can be factory-set permanently or can be adjusted as needed by the manufacturer or user of the flexible towing device according to the invention for single-track vehicles using the adjusting means implemented in the electrical adjusting mechanism 53, 53', 53".

The magnetic adjusting mechanism 53, 53', 53" is realized, for example, but without limitations, by means of a magnet provided in the lock 3, 3" of the towing element assembly 1 and in the locking mechanism assembly 50, respectively, suitable for the mechanism 53, 53', 53". The power of the magnet is selected such that following applying a force to the lock 3, 3" of the towing element assembly 1 being equal to or greater than the release force, the lock 3, 3" is released from the seat 51, 51', 51" of the locking mechanism assembly 50. For example, but without limitations, the magnet is a permanent magnet or an electromagnet. When the magnet is a permanent magnet, the setpoint of the release force F of the magnetic mechanism 53, 53', 53" is permanently factory-set by selecting a magnet having a magnetic force suitable for releasing the lock 3, 3" of the towing element assembly 1 from the seat 51, 51', 51" of the locking mechanism assembly 50, as described above. When the magnet is an electromagnet, the setpoint of the release force F of the magnetic adjusting mechanism 53, 53', 53" can be factory-set permanently or can be adjusted as needed by the manufacturer or user of the flexible towing device according to the invention for single-track vehicles using the adjusting means implemented in the magnetic adjusting mechanism 53, 53', 53".

In a preferred embodiment of the flexible towing device according to the invention for single-track vehicles at least one of the lock 3, 3" of the towing element assembly 1 and the seat 51, 51', 51" of the locking mechanism assembly 50 is configured such that following applying a predetermined force F to the lock 3, 3", the lock 3, 3" is released from the seat 51, 51', 51", as described above, wherein the release force F is variable depending on the angle of its application relative to the locking mechanism assembly 50. In one of the embodiments of the flexible towing device according to the invention for single-track vehicles, the release force F changes linearly with the angle, wherein the release force F has the greatest value $F_O$ when directed substantially along the main axis $O_R$ of the locking mechanism assembly 50, consequently, along the main axis O of the single-track vehicle to which the locking mechanism assembly is attached, and the smallest value of $F_B$, when directed at a substantially right angle relative to the main axis $O_R$ of the locking mechanism assembly 50 and, consequently, is directed at a substantially right angle relative to the man axis O of such single-track vehicle. In another embodiment, the release force F changes non-linearly, for example, but without limitations, exponentially together with the angle, from the maximum value of the release force $F_O$ to the minimum value of the release force $F_B$, where the forces $F_O$ and $F_B$ are defined, as described above. In yet another embodiment of the towing device according to the invention for single-track vehicles, the release force F is constant within a certain angular range around the main axis $O_R$ of the locking mechanism assembly 50, which force corresponds to the release force $F_O$, as described above, whereas beyond this angle, the release force F decreases in steps to a smaller release force corresponding to the release force $F_B$, as described above, or is equal to substantially zero. In the last case, the lock 3, 3" of the towing element assembly 1 is released from the seat 51, 51', 51" of the locking mechanism assembly 50 substantially automatically, substantially without applying any force thereto. In other words, following directing the lock 3, 3" such that the flexible towing element 1 is directed at an angle at which the release force $F_B$ is equal substantially zero, the lock 3, 3" of the towing element assembly 1 comes out of the seat of the locking mechanism assembly 50 substantially by itself. In the embodiment in which the release force F corresponds to the release force $F_O$, the angle falls within the range of 0° to 80°, preferably 0° to 70°, preferably 0° to 65°, and most preferably 0° to 35°, wherein this angle is defined, as described above. In the preferred embodiments with a variable release force F, as described above, when two single-track vehicles are travelling next to each other or when the led single-track vehicle overtakes the leading single-track vehicle, the jerk generated by the flexible towing element 2 of the towing element assembly 1, being directed laterally or backward relative to the direction of travel, is smaller, thus causing a reduction of a particularly dangerous lateral or backward disturbance of balance, increasing the safety of riding with a flexible towing device according to the invention for single-track vehicles. The embodiment in which the release force F disappears is particularly preferred when the led single-track vehicle overtakes the leading single-track vehicle. In such a case, the lock 3, 3" of the towing element assembly 1 takes such an angle in the seat 51, 51', 51" of the locking mechanism assembly 50 that it falls out of this seat automatically without generating a jerk on any of the single-track vehicles, thus even improving the safety of riding with the flexible towing device according to the invention for single-track vehicles. These issues are of particular importance when the led single-track vehicle is a bike ridden by a child. In such a case, the disturbances of balance directed laterally or backward relative to the direction of travel are particularly dangerous and may cause a child to fall.

In a preferred embodiment of the flexible towing device according to the invention for single-track vehicles at least one of the lock 3, 3" of the towing element assembly 1 and the locking mechanism assembly 50 comprises an auxiliary mechanism which facilitates introducing the lock 3, 3" into the seat 51, 51', 51" of the locking mechanism assembly 50. For example, but without limitations, the auxiliary mechanism is a cam mechanism, in which a rotation of the lever connected to the cam causes, respectively, adaptation of the shape of the lock 3, 3" or opening the seat 51, 51',51", allowing the lock 3, 3" to be introduced into the seat 51, 51', 51" without using force. Following placing the lock 3, 3" in the seat 51, 51', 51", the lever is turned back to restore the initial shape of the lock 3, 3" and/or to close the seat 51, 51', 51", thus providing a ready for operation flexible towing device according to the invention for single-track vehicles. In another embodiment of the flexible towing device according to the invention for single-track vehicles, the auxiliary mechanism/auxiliary mechanisms are integrated with the adjusting mechanism of the towing element assembly 1 and/or the adjusting mechanism 53, 53', 53" of the locking mechanism assembly 50, respectively.

One of the embodiments of the flexible towing device according to the invention for single-track vehicles is illustrated in FIG. 2. The flexible towing device comprises a towing element assembly 1 and a locking mechanism assembly 50. The towing element assembly 1 comprises a flexible towing element 2 in the form of a rope (not shown in the figures) and a lock 3 in the form of a rigid ball, attached to one of the ends of the flexible towing element 2. The towing element assembly 1 comprises a winding mechanism 5 of the flexible towing element 2 for winding the flexible towing element 2, adjusting the length of this flexible towing element 2 and/or winding it following its release from the locking mechanism assembly 50, analogously as described above. The winding mechanism 5 is attached to the second end of the flexible towing element 2. The towing element assembly 1 comprises a bracket 4 for mounting the towing element assembly 1 on a single-track vehicle, wherein the bracket 4 is located on the winding mechanism 5, as shown in FIG. 8.

As shown in FIG. 2, the locking mechanism assembly 50 comprises a first portion 54 of the body, said portion being shaped like a teaspoon, comprising a recess constituting a half-seat 55 of the first portion of the body, and a second portion 56 of the body, said portion being shaped like a teaspoon, comprising a recess constituting a half-set 57 of the second portion of the body. The half-seats 55 and 57 of the first and the second portion 54, 56 of the body, respectively, together form the seat 51 of the locking mechanism assembly 50 for receiving the releasable lock 3 of the towing element assembly 1, wherein the shape of said half-seats 55, 57 is complementary with the shape of the lock 3 in the form of a ball. The first and the second portion 54 and 56 of the body are hinge-interconnected such that they change their respective positions relative to each other. As shown in FIG. 2, the first and the second teaspoon-shaped portion 54 and 56 of the body each comprises a protrusion directed substantially along the main axis $O_R$ of the locking mechanism assembly 50, which, following mounting of said mechanism on a single-track vehicle, extends in the same direction as the main axis O of said vehicle. Moreover, as shown in FIG. 2, the first and the second teaspoon-shaped portion 54 and 56 of the body each comprises arched notches on the opposite sides of these portions 54, 55, directed substantially perpendicular to the main axis $O_R$ of the locking mechanism assembly 50. Furthermore, the locking mechanism assembly 50 comprises a bracket 60 for mounting the locking mechanism assembly on a single-track vehicle.

The locking mechanism assembly 50 comprises an adjusting mechanism 53 for adjusting the release force F of the locking mechanism assembly 50. As shown in FIG. 2, the adjusting mechanism 53 comprises a spring acting on one of the portions 54, 56 of the body of the locking mechanism assembly 50 and pushing the portions 54, 56 of the body toward each other thus adjusting the release force F of the locking mechanism 50. Due to the above-described shape of the portions 54, 56, the release force F has a different value depending on the direction of its application to the lock 3 in the form of a ball relative to the portions 54, 56 of the body of the locking mechanism 50. Namely, in a direction substantially within the main axis $O_R$ of the locking mechanism assembly 50, the release force F has a value corresponding to the release force $F_R$ of the locking mechanism 50 due to the presence of the protrusions, as shown in FIG. 2. However, in the direction substantially perpendicular to the main axis $O_R$ of the locking mechanism assembly 50, both in one or the other lateral direction, the release force F has a value smaller than the release force $F_O$ and corresponding to the release force $F_B$ due to the presence of the notches, as shown in FIG. 2.

When ready for operation, the above-described embodiment of the flexible towing device according to the invention for single-track vehicles, the towing element assembly 1 is mounted on one of the single-track vehicles, while the locking mechanism assembly 50 is mounted on the other one of the single-track vehicles such that the main axis $O_R$ of the locking mechanism assembly 50 is directed in the same direction as the main axis O of the vehicle to which said locking mechanism assembly 50 is attached. The lock 3 in the form of a ball is located in the seat 51 between the portions 54 and 56 of the body of the locking mechanism 50. The release force F of the seat 51 is set by means of the adjusting mechanism 53 before or after placing the lock 3 in the form of a ball in said seat 51 of the locking mechanism assembly 50. The lock 3 in the form of the ball is rotatable substantially freely in the seat 51 such that the flexible towing element 2 can take any orientation relative to the slot of the seat 51 of the locking mechanism assembly 50. In this embodiment, "substantially freely" means that the friction forces between the lock 3 of the towing element assembly 1 and the seat 51 of the locking mechanism assembly 50 are very small and thus negligible. In another preferred embodiment, the lock 3 of the towing element assembly 1 is slightly clamped inside the seat 51 of the locking mechanism assembly 50 such that the lock 3 rotates in the seat 51 with a slight constraint. In such an embodiment, the constraint of the rotation of the lock 3 in the seat 51 does not affect the release force $F_O$ and $F_B$, respectively, but only constrains the freedom of movement of the lock 3 in the seat 51, resulting in improving the safety of use of the flexible towing device according to the invention for single-track vehicles. Said safety improvement results, for example, but without limitations, from thus substantially preventing the lock 3 from taking a position in the seat 51 that would be conducive to the flexible towing element 2 being pulled into the wheel of the single-track vehicle to which the locking mechanism assembly 50 is attached.

Following occurrence of an event, as described above, generating a force acting on the flexible towing device according to the above-described embodiment of the invention for single-track vehicles, especially on its flexible towing element 2 of the towing element assembly 1, which is transferred to the lock 3 in the form of a ball. If the force acting on the towing device is greater than or equal to the force set on the seat 51 of the locking mechanism assembly 50 by means of the adjusting mechanism 53, it constitutes the release force F releasing the lock 3 in the form of a ball from the seat 51 formed by the half-seats 55 and 57 of the first and the second portion 54 and 56 of the body, respectively, of the locking mechanism assembly 50. If the force transferred to the lock 3 is directed substantially along the main axis $O_R$ of the locking mechanism assembly 50, then, in order for the lock 3 in the form of a ball to be released, the force applied to such a lock 3 must be greater than or equal to the force corresponding to the release force $F_O$. If the force transferred to the lock 3 is directed substantially perpendicular to the main axis $O_R$ of the locking mechanism assembly 50, then, in order for the lock 3 in the form of a ball to be released, the force applied to such a lock 3 must be greater than or equal to the force corresponding to the release force $F_B$, wherein, as described above, the release force $F_O$ is greater than the release force $F_B$. When the force acting on the ball-shaped lock 3 causes the ball of the lock 3 to exert pressure on the walls of the seat 51 of the locking mechanism assembly 50, it overcomes the load of the spring of the adjusting mechanism 53 and moves apart the portions 54 and 56 of the body of the locking mechanism 50. When the force applied to the ball-shaped lock 3 is greater than or equal to the release force $F_O$ or $F_B$, respectively, the portions 54 and 56 of the body of the locking mechanism assembly 50 move apart overcoming the load of the spring sufficiently to allow the ball-shaped lock 3 to overcome the edges of the seat 51, respectively, depending on the direction of the force applied, and slide out of it thus decoupling the towing element assembly 1 from the locking mechanism assembly 50 of the towing device according to the invention for single-track vehicles. Therefore, according to the above-described embodiment of the flexible towing device for single-track vehicles, the jerk releasing the lock 3 of the towing element 1 assembly from the locking mechanism assembly 50 is less powerful in the lateral direction, thus resulting in a smaller disruption of balance when the led single-track vehicle is moving next to the leading single-track vehicle or then the led single-track vehicle overtakes the leading single-track vehicle.

The lock 3 can also have a different shape. The lock 3 of the towing element assembly 1 may have any shape allowing its rotation in the seat 51 of the locking mechanism assembly 50 substantially at least horizontally. For example, but without limitations, the lock 3 may be shaped like a disc with an ellipsoidal cross-section, a double cone, a pyramid, etc. The shape of the recesses of the half-seats 55, 57 of the first and the second portion 54, 56 of the body, respectively, of the locking mechanism assembly 50 is complementary with such other selected shapes of the lock 3 of the towing element assembly 1.

Moreover, also a reverse configuration is possible of the flexible towing device according to the invention for single-track vehicles having a ball-shaped lock 3 and teaspoon-shaped portions 54 and 56 of the body, as described above. This means that the seat 51 of the locking mechanism assembly 50 is set permanently, while the lock 3 has an inherently implemented release force F or comprises an adjusting mechanism for adjusting such release force F. In such a case, if subjected to a force, the lock 3 changes shape and, if the force is greater than or equal to the release force $F_O$ or $F_B$, respectively, depending on its direction, the change of the shape of the lock 3 is sufficient to cause its release from the seat 51 of the locking mechanism 50 in the direction of such the force.

Another embodiment of the flexible towing device according to the invention for single-track vehicles is illustrated in FIG. 3. The flexible towing device comprises a towing element assembly 1 and a locking mechanism assembly 50. The towing element assembly 1 comprises a flexible towing element 2 in the form of a rope (not shown in the figures). The towing element assembly 1 comprises a lock 3. The lock 3 comprises a ball and a rod, wherein the rod is connected to the ball by means of one of its ends. The other end of the rod of the lock 3 is connected to one of the ends of the flexible towing element 2 in the form of a rope. The towing element assembly 1 comprises a winding mechanism 5 of the flexible towing element for winding the flexible towing element 2, adjusting the length of this flexible towing element 2 and/or winding it following its release from the locking mechanism assembly 50, in a similar manner as described above. The winding mechanism 5 is attached to the second end of the flexible towing element 2. The towing element assembly 1 comprises a bracket 4 for mounting the towing element assembly 1 on a single-track vehicle, wherein the bracket 4 is located on the winding mechanism 5, as shown in FIG. 8.

As shown in FIG. 3, the locking mechanism assembly 50 comprises a first portion 54' of the body in the form of a flat bar with a rounded end. The first portion 54' of the body comprises a recess extending along the rounded end of the first portion 54' of the body, as shown in FIG. 3, wherein the recess constitutes the half-seat 55' of the first portion 54' of the body. As shown in FIG. 3, the locking mechanism assembly 50 comprises also a second portion 56' of the body in the form of a flat bar with a rounded end. The second portion 56' of the body comprises a recess extending along the rounded end of the second portion 56' of the body, as shown in FIG. 3, wherein the recess constitutes the half-seat 57' of the second portion 56' of the body. The half-seats 55' and 57' of the first and the second portion 54', 56' of the body, respectively, together comprise the seat 51' of the locking mechanism assembly 50 for receiving the releasable lock 3 of the towing element assembly 1, wherein these half-seats 55', 57' constitute tracks allowing substantially free movement of the ball of the lock 3 in the seat 51' along the rounded ends of the first and the second portion 54', 56' of the body of the locking mechanism 50. The first and the second portion 54', 56' of the body each comprises two notches 59' situated opposite each other on the opposite sides of a given first and second portion 54', 56' of the body, which discontinue the half-seats 55', 57' respectively. Furthermore, the notches 59' of the neighbouring first and second portion 54', 56' of the body are situated opposite each other such that they form an opening through which the ball of the lock 3 can substantially freely fall out of the seat 51' thus causing the towing element assembly 1 to be released from the locking mechanism assembly 50. The situation of the openings formed by the notches 59' on the opposite sides of the locking mechanism assembly 50, as described above, is such that the seat 51' is defined within the angle between a given opening and the main axis $O_R$ of the locking mechanism assembly 50 ranging from 80° to 90°. In a preferred embodiment of the flexible towing device according to the invention for single-track vehicles, the position angle of an opening ranges between 70° and 90°. In a preferred embodiment of the flexible towing device according to the invention for single-track vehicles, the position angle of an opening ranges between 65° and 90°. In yet another preferred embodiment of the flexible towing device according to the invention for single-track vehicles, the position angle of an opening ranges between 35° and 90°. The position angle of a given opening is defined independently between a straight line extending through the centre of such opening and the centre of the circle which best describes the rounding of the seat 51' of the locking mechanism assembly 50, and the main axis $O_R$ of the locking mechanism assembly 50 extending through the centre of this circle, where the main axis $O_R$ of the locking mechanism assembly extends in the same direction as the main axis O of the single-track vehicle to which the locking mechanism assembly 50 is attached. In one of the embodiments of the flexible towing device according to the invention for single-track vehicles, the position angles of the openings for automatic releasing of the lock 3 of the towing element assembly 1 from the locking mechanism assembly 50 have the same value, as described above. In another embodiment of the flexible towing device according to the invention for single-track vehicles, the position angles of the openings for automatic releasing of the lock 3 of the towing element assembly 1 from the locking mechanism assembly 50 have different, independent values selected from the above-described range. Furthermore, the locking mechanism assembly 50 comprises a bracket 60 for mounting the locking mechanism assembly on a single-track vehicle.

The locking mechanism assembly 50 comprises an adjusting mechanism 53 for adjusting the release force F of the locking mechanism assembly 50. As shown in FIG. 3, the adjusting mechanism 53' comprises a spring acting on one of the portions 54', 56' of the body of the locking mechanism assembly 50 and pushing the portions 54', 56' of the body toward each other thus adjusting the release force F of the locking mechanism 50. Due to the above-described shape of the seat 51', the release force F has a different value depending on the direction of its application to the lock 3 relative to the portions 54', 56' of the body of the locking mechanism assembly 50. Namely, in the direction in which the seat 51' of the locking mechanism 50 assembly is positioned, the release force F has a value corresponding to the release force $F_R$ of the locking mechanism assembly. As the openings are situated, as described above, the seat 51' extends from the main axis $O_R$ of the locking mechanism assembly to an opening at an angle of up to 80°, more preferably up to 70°, preferably up to 65° and most preferably up to 35°. However, in the direction in which one of the openings formed by the notches 59' is situated, as described above, the release force F has a value corresponding to the release force $F_B$ having a value of substantially zero, that is, in the openings of the locking mechanism assembly there is no release force F.

As described above, when ready for operation, the towing element assembly 1 is mounted on one of the single-track vehicles, while the locking mechanism assembly 50 is mounted on the other one of the single-track vehicles such that the main axis $O_R$ of the locking mechanism assembly 50 is directed in the same direction as the main axis O of the vehicle to which said locking mechanism assembly 50 is attached. The ball of the lock 3 is situated in the seat 51' between the portions 54' and 56' of the body of the locking mechanism assembly 50 and is movable therein substantially freely, that is, the ball of the lock 3 is movable in contact with at least one track constituting the half-seat 55', 57'. The release force F of the seat 51' is set by means of the adjusting mechanism 53' before or after placing the ball of the lock 3 in said seat 51' of the locking mechanism assembly 50. As mentioned above, the ball of the lock 3 is rotatable substantially freely in the seat 51' such that the flexible towing element 2 can take any orientation relative to the slot of the seat 51' of the locking mechanism assembly 50. Similarly, in this embodiment "substantially freely" means that the friction forces between the lock 3 of the towing element assembly 1 and the seat 51' of the locking mechanism assembly 50 are very small and thus negligible. In another preferred embodiment, the lock 3 of the towing element assembly 1 is slightly clamped inside the seat 51' of the locking mechanism assembly 50 such that the lock 3 changes its position in the seat 51' with a slight constraint. In such an embodiment, the constraint of the movement and/or rotation of the lock 3 in of the towing element assembly 1 in the seat 51' of the locking mechanism assembly 50 does not affect the release force $F_O$ and $F_B$, respectively, but only constrains the freedom of movement of the lock 3 in the seat 51', resulting in improving the safety of use of the flexible towing device according to the invention for single-track vehicles. Said safety improvement results, for example, from preventing the lock 3 from thus taking a substantially free position in the seat 51' that would be conducive to the falling of the lock 3 of the towing element assembly 1 out of the seat 51' of the locking mechanism assembly 50.

Following occurrence of an event, as described above, generating a force acting on the flexible towing device according to the above-described embodiment of the invention for single-track vehicles, especially on its flexible towing element 2 of the towing element assembly 1, which is transferred to the lock 3. If the force acting on the towing device is greater than or equal to the force set on the seat 51' of the locking mechanism assembly 50 by means of the adjusting mechanism 53', it constitutes the release force F releasing the lock 3 in the form of a ball from the seat 51' formed by the half-seats 55' and 57' of the first and the second portion 54' and 56' of the body, respectively, of the locking mechanism assembly 50. If the force transferred to the lock 3 is directed such that the ball of the lock 3 of the towing element assembly 1 moves or is situated in the seat 51' of the locking mechanism assembly 50, then, in order for the lock 3 to be released, the force applied to such a lock 3 must be greater than or equal to the force corresponding to the release force $F_O$. As described above, when the force acting on the ball of the lock 3 causes the ball exerts pressure on the walls of the seat 51' of the locking mechanism assembly 50, it overcomes the load of the spring of the adjusting mechanism 53' and moves apart the portions 54' and 56' of the body of the locking mechanism 50. Similarly, when this force applied to the ball of the lock 3 is greater than or equal to the release force $F_O$, the portions 54' and 56' of the body of the locking mechanism assembly 50 moves apart overcoming the load of the spring sufficiently to allow the ball of the lock 3 to overcome the edges of the seat 51' and slide out of it thus decoupling the towing element assembly 1 from the locking mechanism assembly 50 of the flexible towing device according to the invention for single-track vehicles. If the force transferred to the lock 3 is directed such that the ball of the lock 3 of the towing element assembly 1 moves or is situated in the opening of the locking mechanism assembly 50 in which there is no seat 51', the lock 3 of the towing element assembly 1 falls out of the seat 51' of the locking mechanism assembly substantially automatically. Therefore, in the above-described embodiment of the flexible towing device for single-track vehicles, when the led single-track vehicle is moving next to the leading single-track vehicle, the lock 3 of the towing element assembly 1 is released from the locking mechanism assembly 50 practically without a jerk, as a result of which, no lateral or backward disturbance is caused to any of the single-track vehicles relative to their movement. Therefore, the flexible towing device according to this embodiment is even safer to use with two single-track vehicles connected by such a towing device.

Again, the lock 3 can have a different shape. The lock 3 of the towing element assembly 1 can have any shape allowing its movement in the seat 51' of the locking mechanism assembly 50, as described above. For example, but without limitations, the lock 3 may be shaped like a disc with an ellipsoidal section, a double cone, a pyramid etc. The shape that the half-seats 55', 57' of the first and second portion 54', 56' of the body of the locking mechanism should have is complementary with other selected shapes of the lock 3 of the towing element assembly 1 and allow its movement in this seat 51', as described above.

Again, a reverse configuration of the flexible towing device according to the invention for single-track vehicles is possible, with the lock 3 with a ball and the portions 54' and 56' of the body with the half-seats 55', 57', forming the arched seat 51' extending along the rounded ends of these portions 54', 56', as described above. That is, the seat 51' of the locking mechanism assembly 50 is set permanently, while the lock 3 has an inherently implemented release force F or comprises an adjusting mechanism for adjusting such release force F. In such case, if subjected to a force, the lock 3 changes shape and, if the force is greater than or equal to the release force $F_O$, when the lock 3 is inside the seat 51', the change of the shape of the lock 3 is sufficient to cause its release from the seat 51' of the locking mechanism 50 in the direction of such force.

Figure 5:
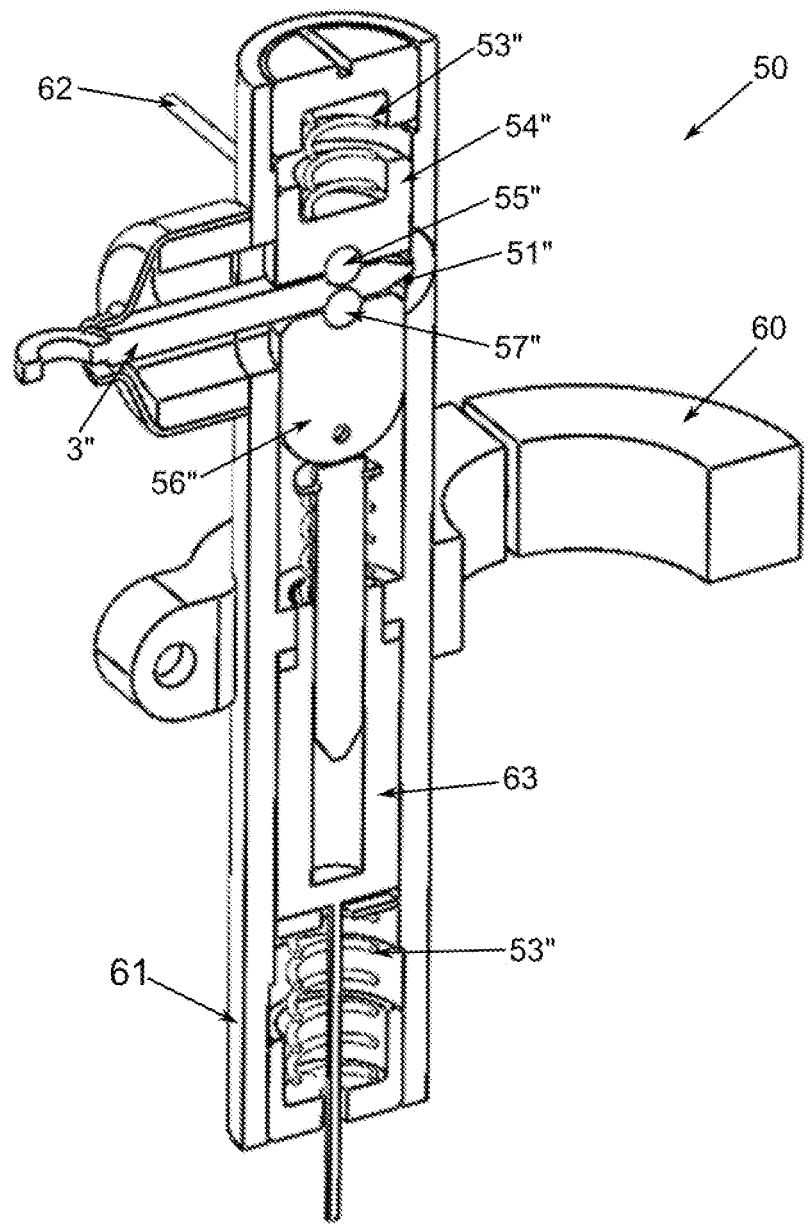
FIG. 5 illustrates a perspective view of a longitudinal section of the locking mechanism assembly with the lock of the towing element assembly according to the embodiment of the flexible towing device of FIG. 4.
Figure 6:
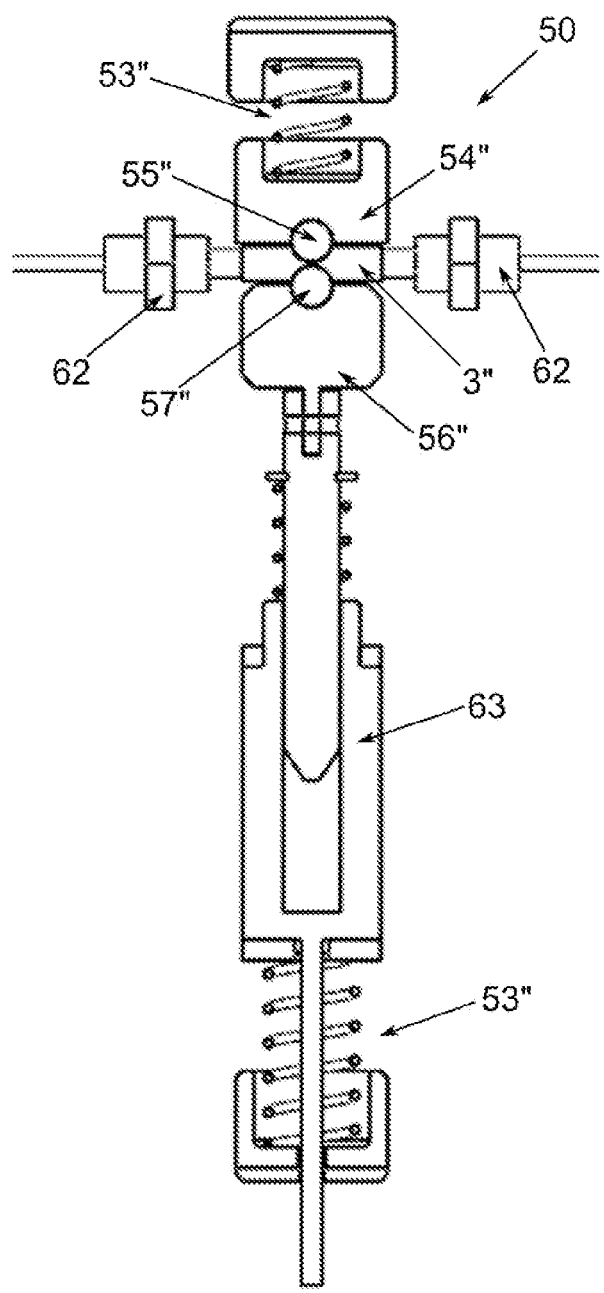
FIG. 6 illustrates a longitudinal cross-section of the locking mechanism assembly together with a lock of the towing element assembly embodiment of the flexible towing device according to the invention for single-track vehicles of FIG. 4.
Figure 7:
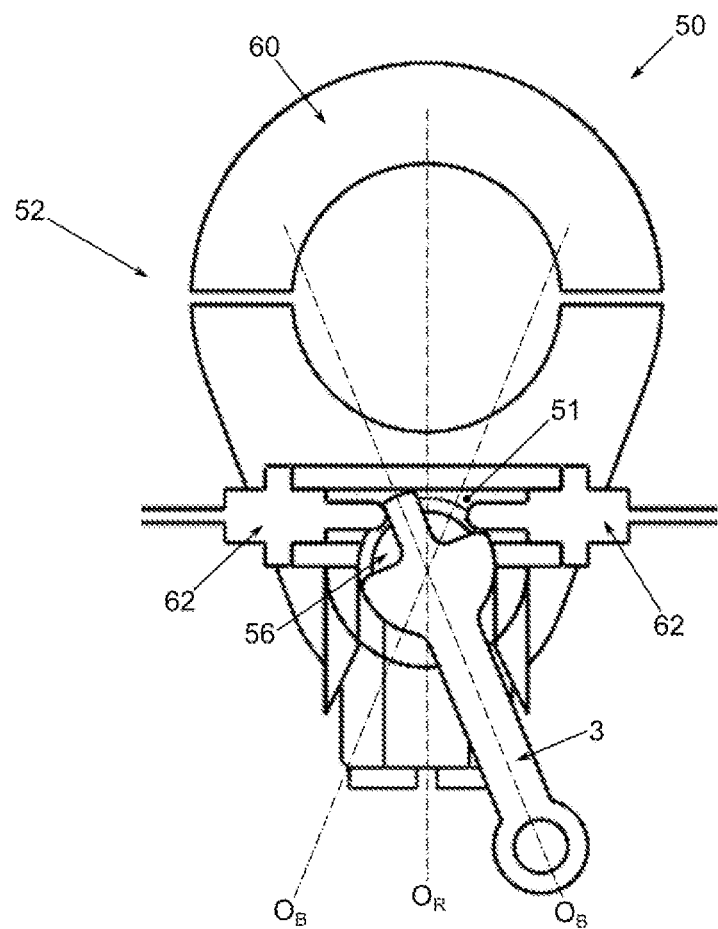
FIG. 7 illustrates a cross-section of the seat of the locking mechanism assembly together with the lock of the towing element assembly according to the embodiment of the flexible towing device of FIG. 4.

Yet another embodiment of the flexible towing device according to the invention for single-track vehicles is illustrated in FIGS. 4 to 7. The flexible towing device comprises a towing element assembly 1 and a locking mechanism assembly 50. The towing element assembly 1 comprises a flexible towing element 2 in the form of a rope (not shown in the figures). The towing element assembly 1 comprises a lock 3". The lock 3" comprises a flat bar shaped like a half-circle and a rod, wherein the rod is connected by means of one of its ends to the rounded side of the flat bar, as shown in FIG. 7. The flat bar of the lock 3" comprises a protrusion situated on the opposite side relative to the rod, as shown in FIG. 7. The flat bar of the lock also comprises two recesses located on its opposite sides and in the vicinity of the protrusion. The other end of the rod of the lock 3" is connected to one of the ends of the flexible towing element 2 in the form of a rope. The towing element assembly 1 comprises a winding mechanism 5 of the flexible towing element for winding the flexible towing element 2, adjusting the length of this flexible towing element 2 and/or winding it following its release from the locking mechanism assembly 50, in a similar manner as described above. The winding mechanism 5 is attached to the second end of the flexible towing element 2. The towing element assembly 1 comprises a bracket 4 for mounting the towing element assembly 1 on a single-track vehicle, wherein the bracket 4 is located on the winding mechanism 5, as shown in FIG. 8.

As shown in FIG. 5, the locking mechanism assembly 50 comprises a cover 61 in the form of a bushing, a first portion 54" of the body generally shaped like a cylinder, and a second portion 56" of the body generally shaped like a cylinder, wherein the first and the second portion 54", 56" of the body are arranged slidably in the bushing one over the other such that they can come close to or move away from each other. The first and the second portion 54", 56" of the body each comprises a ball constituting a half-seat 55", 57", respectively, situated on the surfaces of the first and the second portion of the body, these surfaces facing each other, as shown in FIGS. 5 and 6. The ball-shaped half-seats 55", 57" form, in the first and in the second portion 54", 56", respectively, of the body, a seat 51" of the locking mechanism assembly 50 for receiving the releasable flat bar of the lock 3" of the towing element assembly 1, wherein the shape of these ball-shaped half-seats 55", 57" is complementary with the recesses in the flat bar of the lock 3" of the towing element assembly 1 and, following placing said lock 3" in the seat 51", it is rotatable in said seat 51" around the axis connecting the balls of the half-seats 55", 57" of the individual portions of 54", 56" of the body. Furthermore, the locking mechanism assembly 50 comprises a bracket 60 for mounting the locking mechanism assembly on a single-track vehicle.

The locking mechanism assembly 50 comprises an adjusting mechanism 53" for adjusting the release force F of the locking mechanism assembly 50. As shown in FIGS. 5 and 6, the adjusting mechanism 53" comprises a spring acting on one of the portions 54", 56" of the body of the locking mechanism assembly 50 and pushing the portions 54", 56" of the body toward each other, and a screw for changing the spring load and thus for changing the force pushing these portions 54", 56" toward each other, thus adjusting the release force F of the locking mechanism assembly 50. The adjusting mechanism 53" of the locking mechanism assembly 50 also comprises two contact sensors 62 for releasing the lock 3" from the towing element assembly 1 after the protrusion of the lock 3" comes into contact with any of these sensors 62. The contact sensors 62 are arranged on the sides of the seat 51" of the locking mechanism assembly 50 such that a horizontal rotation of the lock 3" in the seat 51" around the axis connecting the half-seats 55", 57" by an angle of 80° causes the protrusion of the lock 3" to come into contact with the contact sensor 62 and its release from the seat 51" of the locking element assembly. In a preferred embodiment, the angle at which the lock 3" rotates in the seat 51" and comes into contact with the contact sensor 62 is 70°. In a more preferred embodiment, the angle at which the lock 3" rotates in the seat 51" and comes into contact with the contact sensor 62 is 65°. In the most preferred embodiment, the angle at which the lock 3" rotates in the seat 51" and comes into contact with the contact sensor 62 is 35°. The above-mentioned position angle of the respective contact sensor 62" is defined between the axis of the lock 3" and the main axis $O_R$ of the locking mechanism assembly. The adjusting mechanism 53" comprises an execution mechanism for releasing the lock 3" when the latter comes into contact with one of the contact sensors 62, as described above. The execution mechanism comprises an electromagnet 63 in cooperation with the spring from the second portion 54", 56" of the body. After the lock contacts any of the contact sensors 62, the electromagnet 63 generating a force on the spring is started. The starting of the electromagnet 63 causes retraction of this portion 54", 56" of the body and opening of the seat 51" of the locking mechanism assembly 50, thus substantially causing the lock 3" to be freely released from the locking mechanism assembly 50. The adjusting mechanism 53" also comprises a control and power supply system for controlling the contact sensors and the execution mechanisms for releasing the lock 3" from the seat 51" of the locking mechanism assembly 50. Due to the above-described structure of the seat 51", the release force F has a different value depending on the direction of its application to the lock 3" relative to the portions 54", 56" of the body of the locking mechanism assembly 50. Namely, in the direction in which the lock 3" rotates in the seat 51" of the locking mechanism assembly 50 between individual contact sensors, the release force F has a value corresponding to the release force $F_O$ of the locking mechanism assembly 50. However, in the direction in which one of the contact sensors 62 is situated, as described above, the release force F has a value corresponding to the release force $F_B$ having a value of substantially zero, that is, when the lock 3" comes into contact with a given contact sensor 62 of the locking mechanism assembly 50, there is no release force F.

As described above, when ready for operation, the towing element assembly 1 is mounted on one of the single-track vehicles, while the locking mechanism assembly 50 is mounted on the other one of the single-track vehicles such that the main axis $O_R$ of the locking mechanism assembly 50 is directed in the same direction as the main axis O of the vehicle to which said locking mechanism assembly 50 is attached. The flat bar of the lock 3" is situated in the seat 51" between the portions 54" and 56" of the body of the locking mechanism assembly 50 such that the balls of the first and the second portion 54", 56" of the body are located in the recesses of the lock 3", respectively, as shown in FIGS. 5 and 6. The lock 3" of the towing element assembly 1 is rotatable in the seat 51" of the locking mechanism assembly 50, as described above, within an angular range between two opposite contact sensors 62. The release force F of the seat 51" is set by means of the adjusting mechanism 53" before or after placing the ball of the lock 3" in said seat 51" of the locking mechanism assembly 50. As mentioned above, the lock 3" is rotatable substantially freely in the seat 51" such that the flexible towing element 2 can take any orientation at least horizontally relative to the slot of the seat 51" of the locking mechanism assembly 50. Again, in this embodiment, "substantially freely" means that the friction forces between the lock 3" of the towing element assembly 1 and the seat 51" of the locking mechanism assembly 50 are very small and thus negligible. In another preferred embodiment, the lock 3" of the towing element assembly 1 is slightly clamped inside the seat 51" of the locking mechanism assembly 50 such that the lock 3" rotates in the seat 51" with a slight constraint. In such embodiment, the constraint of the rotation of the lock 3" in the seat 51" does not affect the release force $F_O$ and $F_B$, respectively, but only constrains the freedom of movement of the lock 3" in the seat 51", resulting in improving the safety of use of the flexible towing device according to the invention for single-track vehicles. The safety improvement results, for example, from thus substantially preventing the lock 3" from rotating freely horizontally in the seat 51", which would be conducive to an unintended release of the lock 3" following it coming into contact with any of the contact sensors 62 caused by a greater vertical deflection of the single-track vehicle to which the locking mechanism assembly is attached, which deflection is not always related to a dangerous situation such as a fall of such a vehicle.

Following occurrence of an event, as described above, generating a force acting on the flexible towing device according to the above-described embodiment of the invention for single-track vehicles, especially on its flexible towing element 2 of the towing element assembly 1, which is transferred to the lock 3". If the force acting on the towing device is greater than or equal to the force set on the seat 51" of the locking mechanism assembly 50 by means of the adjusting mechanism 53", it constitutes the release force F releasing the lock 3" in the form of a flat bar from the seat 51" formed by the half-seats 55" and 57" of the first and the second portion 54" and 56" of the body, respectively, of the locking mechanism assembly 50. If the force transferred to the lock 3" is directed such that the lock 3" of the towing element assembly 1 moves or is situated in the seat 51" of the locking mechanism assembly 50 without coming into contact with any of the contact sensors 62, then, in order for the lock 3" to be released, the force applied to such a lock 3" must be greater than or equal to the force corresponding to the release force $F_O$. Similarly, when the force acting on the flat bar of the lock 3" causes it to exert pressure on the balls of the seat 51" of the locking mechanism assembly 50, it overcomes the load of the spring of the adjusting mechanism 53" and moves apart the portions 54" and 56" of the body of the locking mechanism 50. Similarly, when the force applied to the flat bar of the lock 3" is greater than or equal to the release force $F_O$, the portions 54" and 56" of the body of the locking mechanism assembly 50 moves apart overcoming the load of the spring sufficiently to allow the flat bar of the lock 3" to overcome the peak points of the ball of the seat 51" and slides out of it thus decoupling the towing element assembly 1 from the locking mechanism assembly 50 of the flexible towing device according to the invention for single-track vehicles. If the force transferred to the lock 3" is directed such that the lock 3" of the towing element assembly 1 rotates to be or is positioned in the seat 51" of the locking mechanism assembly 50 such that in comes into contact with any of the contact sensors 62, the lock 3" of the towing element assembly 1 falls out of the seat 51" of the locking mechanism assembly 50 substantially by itself as a result of operation of the execution mechanism of the adjusting mechanism 53", as described above. Therefore, in the above-described embodiment of the flexible towing device for single-track vehicles, when the led single-track vehicle is moving next to the leading single-track vehicle, the lock 3" of the towing element assembly 1 is released from the locking mechanism assembly 50 practically without a jerk, as a result of which, no lateral or backward jerk is caused to any of the single-track vehicles relative to their movement. Therefore, the flexible towing device according to this embodiment is even safer to use with two single-track vehicles connected by such a towing device. Moreover, as a single-track vehicle falls, its orientation relative to the vertical position changes. In such a case, the lock 3" of the towing element assembly rotates, substantially under its own weight, in the seat 51" of the locking mechanism assembly 50, such that it comes into contact with one of the contact sensors 62, respectively. Consequently, as such a single-track vehicle falls, the lock 3" of the towing element assembly 1 falls out of the seat 51" of the locking mechanism assembly 51" substantially by itself, as described above, thus improving the safety of use of the flexible towing device according to the invention for single-track vehicles.

In a preferred embodiment, the adjusting mechanism 53" of the locking mechanism assembly 50 additionally comprises a gyroscope for immediate releasing of the towing element assembly 1 from the locking mechanism assembly 50 as the single-track vehicle to which the locking mechanism assembly is attached falls. The gyroscope is connected to the execution mechanism for releasing the lock 3" of the towing element assembly 1 from the locking mechanism assembly 50. As the single-track vehicle to which the locking mechanism assembly 50 is attached falls, the execution mechanism releases the lock 3" from the seat 51" of the locking mechanisms assembly 50, as described above, when the protrusion of the lock 3" comes into contact with a contact sensor 62. A single-track vehicle is considered to be falling when the angle of its deflection from the vertical position is greater than 60°, preferably 45°, and most preferably 30°. The gyroscope is controlled and powered by means of the control and power supply system of the adjusting mechanism 53" of the locking mechanism assembly 50.

Again, the lock 3" can have a different shape. The lock 3" of the towing element assembly 1 can have any shape allowing its rotation in the seat 51" of the locking mechanism assembly 50 and its coming into contact with the contact sensors 62, as described above. Moreover, the elements and their spatial arrangement is such that they ensure contact with the contact sensors 62 in specified angular positions of the lock 3" in the seat 51". The shape of the half-seats 55", 57" of the first and the second portion 54", 56" of the body of the locking mechanism assembly is complementary with such other selected shapes of the lock 3" of the towing element assembly 1 and allows its rotation in said seat 51", as described above.

Again, a reverse configuration is possible of the flexible towing device according to the invention for single-track vehicles having a lock 3" with a flat bar and the portions 54" and 56" having ball-shaped seats 55", 57", as described above. This means that the seat 51" of the locking mechanism assembly 50 is set permanently, while the lock 3" has an inherently implemented release force F or comprises an adjusting mechanism for adjusting such release force F. In such a case, if subjected to a force, the lock 3" changes shape and, if the force is greater than or equal to the release force $F_O$, the change of the shape of the lock 3" is sufficient to cause its release from the seat 51" of the locking mechanism 50 in the direction of such force.

According to the above embodiment, the adjusting mechanism 53" comprises adjusting the release force $F_O$ of the seat 51", handling of the contact sensors 62 and the related execution mechanism having an electromagnet 63, as well as the handling of the gyroscope and the related execution mechanism. A different implementation of the adjusting mechanism 53" is also possible. Namely, one can provide a separate adjusting mechanism for adjusting the release force F on the seat 51" of the locking mechanism assembly 50, a separate system for handling the contact sensors 62 and the related execution mechanism having an electromagnet 63, and a separate system for handling the gyroscope and the related execution mechanism. In one of the embodiments, the execution mechanism for the contact sensors 62 is the same as for the gyroscope. In one embodiment, an execution mechanism is provided for contact sensors 62 and a second execution mechanism for the gyroscope.

A flexible towing device is described above in the context of use with a pair of bicycles, wherein the bicycle in the front is ridden by a parent and the bicycle ridden in the back is ridden by a child. However, the flexible towing device according to the invention for single-track vehicles can be used with any single-track vehicles, such as motorcycles, mopeds, push bicycles and push boards. Furthermore, the flexible towing device for single-track vehicles can be used with two-track or three-track vehicles, such as three-wheeled motorcycles, three-wheeled bicycles and three-wheeled push boards. Therefore, in general, the flexible towing device for single-track vehicles can be used for towing any vehicle led by a leading vehicle, both of which were described above by way of example, wherein the advantages of the flexible towing device are used, as described herein.

The above disclosure relates to the flexible towing device according to the invention for single-track vehicles, which provides towing a single-track vehicle led by a leading single-track vehicle, eliminating or at least reducing the disadvantages of rigid towing devices known from prior art. Moreover, the flexible towing device according to the invention for single-track vehicles has additional advantages, as described above.

The features indicated in the above-described embodiments of the invention, especially the preferred embodiments of the invention, can be combined or replaced in any given way and in any given combination, whereby all new connections or combinations possible are deemed to be fully disclosed in the description of the present invention, provided that they do not comprise conflicting features.

The invention is described above by means of preferred embodiments only by way of example. Based on the above disclosure a specialist in the field recognizes that modifications, variants or equivalents are possible that fall within the spirit and the inventive intention of the present invention without exceeding the scope of the attached claims.

REFERENCE NUMBERS LIST

Leading single-track vehicle
Led single-track vehicle
1 towing element assembly
2 flexible towing element of the towing element assembly
3, 3" lock of the towing element assembly
4 bracket of the flexible towing device
5 winding mechanism of the flexible towing device
50 locking mechanism assembly
51, 51', 51" seat of the locking mechanism assembly
52, 52', 52' grip of the locking mechanism assembly
53, 53', 53' seat adjusting mechanism
54, 54', 54' first portion of the body
55, 55', 55" half-seat of the first portion of the body 56, 56', 56" second portion of the body
57, 57', 57" half-seat of the second portion of the body
58, 58', 58" protrusion in a portion of the body
59, 59' notch in a portion of the body
60 bracket for mounting the locking mechanism assembly on a single-track vehicle
61 housing of the locking mechanism assembly
62 contact sensor
63 electromagnet
O main axis of a single-track vehicle
$O_R$ main axis of the locking mechanism assembly
$O_B$ lateral axis of the locking mechanism assembly
F release force
$F_O$ axial release force
$F_B$ lateral release force

The invention claimed is:

1. A towing element assembly for a flexible towing device for single-track vehicles, the flexible towing device comprises:
a towing element assembly; and
a locking mechanism assembly, wherein the towing element assembly is adapted for mounting on a single-track vehicle and comprises:
a flexible towing element, and
a lock for detachable coupling in the locking mechanism assembly, wherein the lock is attached to one of the ends of the flexible towing element, and the lock is releasable from the locking mechanism assembly,
wherein the lock is configured to be releasable by a release force which releases the towing element assembly when said release force is applied to the lock via said towing element assembly,
wherein the lock is operable between a first axis being arranged substantially along a longitudinal axis of said locking mechanism assembly, said longitudinal axis extending substantially in a same direction as a longitudinal axis of said single-track vehicle when said locking mechanism assembly is mounted on said single-track vehicle, and a second axis being arranged laterally to the longitudinal axis of the locking mechanism assembly and defining a lateral axis of said mechanism,
wherein the release force includes a first release force applied substantially along the longitudinal axis and a second release force applied substantially along the lateral axis, wherein the second release force is smaller than the first release force or the second release force is equal to substantially zero.

2. A towing element assembly according to claim 1, wherein the lock comprises an adjusting mechanism for setting or adjusting the release force.

3. A towing element assembly according to claim 1, wherein the first release force is constant across an angular range of operation of the lock, the angular range defined between the first axis and the second axis.

4. A towing element assembly according to claim 1, wherein the first release force directed toward the locking mechanism assembly at an angle between the longitudinal axis and the lateral axis ranges from 0° to 80°.

5. A towing element assembly according to claim 1, wherein the lock comprises a component having a shape selected from among a hemisphere, a ball, a disc, a cone, a double cone, a bipyramid, a flat bar with recesses, for releasable fitting in the locking mechanism assembly.

6. A towing element assembly according to claim 1, further comprising a winding mechanism for winding or unwinding the flexible towing element for adjusting a length of the flexible towing element or winding the flexible towing element following releasing the towing element assembly from the locking mechanism assembly.

7. A towing element assembly according to claim 1, further comprising a bracket for mounting on the single-track vehicle.

8. A locking mechanism assembly for a flexible towing device for single-track vehicles, the flexible towing device comprising:
a towing element assembly; and
a locking mechanism assembly, wherein the locking mechanism assembly is adapted for mounting on a single-track vehicle, the locking mechanism assembly comprising:
a first portion of a body, comprising a first half-seat, and
a second portion of the body, comprising a second half-seat, which first and second half-seats of the corresponding first and the second portions of the body form together a seat for detachable coupling of the towing element assembly,
wherein the seat of the locking mechanism assembly is configured to assure a release force for releasing the towing element assembly when said release force is applied to the locking mechanism assembly via said towing element assembly,
a first axis arranged substantially along a longitudinal axis of said locking mechanism assembly, said longitudinal axis extending substantially in a same direction as a longitudinal axis of said single-track vehicle when said locking mechanism is mounted on said single-track vehicle,
a second axis arranged laterally to the longitudinal axis of the locking mechanism assembly and defining a lateral axis of said locking mechanism assembly,
wherein the first half-seat of the first portion of the body seat and the second half-seat of the second portion of the body are configured to provide to said seat said release force, the said release force including a first release force applied substantially along the longitudinal axis and a second release force applied substantially along the lateral axis, wherein the second release force is smaller than the first release force or the second release force is equal to substantially zero.

9. A locking mechanism assembly according to claim 8, further comprising an adjusting mechanism for setting or adjusting the release force.

10. A locking mechanism assembly according to claim 8, wherein the first half-seat of the first portion of the body and the second half-seat of the second portion of the body are configured to assure the first release force is constant across an angular range of the seat, which angular range is defined between the first axis and the second axis.

11. A locking mechanism assembly according to claim 8, wherein the first and the second portions of the body are each shaped like a teaspoon and comprises a half-seat in the form of a recess, wherein the first and the second portions of the body each comprises a protrusion arranged substantially along the longitudinal axis and configured to assure the first release force applied substantially along said axis having a maximum value, and an arched notch arranged substantially along the lateral axis and configured to assure the second release force applied substantially along the lateral axis having a minimum value.

12. A locking mechanism assembly according to claim 11, wherein each notch of the first and the second portions is arranged independently so that an angle between the lateral axis and the longitudinal axis is in the range from 0° to 80°.

13. A locking mechanism assembly according to claim 8, wherein the first and the second portions of the body are each shaped like a flat bar with a rounded end, the flat bar comprises a notch arranged along the lateral axis and configured to assure the second release force applied substantially along said axis having a value substantially zero, and the seat in a form of a track arranged along the rounded end between the notch and the longitudinal axis and configured to assure the first release force is applied along said track.

14. A locking mechanism assembly according to claim 13, wherein each notch of the first and the second portions is arranged independently so that an angle between the lateral axis and the longitudinal axis is in the range from 70° to 90°.

15. A flexible towing device for single-track vehicles, comprising:
 a towing element assembly adapted for mounting on a first one of two single-track vehicles and comprising:
  a flexible towing element,
  a lock attached to one of the ends of the flexible towing element, and
 a locking mechanism assembly adapted for mounting on a second one of two single-track vehicles, the locking mechanism assembly including:
  a first portion of a body, comprising a first half-seat, and
  a second portion of the body, comprising a second half-seat, which first and second half-seats of the corresponding first and the second portions of the body form together a seat for detachable coupling of a lock of the towing element assembly,
  wherein the seat of the locking mechanism assembly is configured to assure a release force for releasing the lock of the towing element assembly from the seat of the locking mechanism assembly when said release force is applied via said lock of the towing element assembly,
  a first axis arranged substantially along a longitudinal axis of said locking mechanism assembly, said longitudinal axis extending substantially in a same direction as a longitudinal axis of said single-track vehicle when said locking mechanism assembly is mounted on said single-track vehicle,
  a second axis arranged laterally to the longitudinal axis of the locking mechanism assembly and defining a lateral axis of said locking mechanism assembly,
  wherein the first half-seat of the first portion of the body and the second half-seat of the second portion of the body are configured to provide to said seat said release force, the said release force including a first release force applied substantially along the longitudinal axis and a second release force applied substantially along the lateral axis, wherein the second release force is smaller than the first release force or the second release force is equal to substantially zero.

16. A flexible towing device for single-track vehicles according to claim 15, wherein the lock of the towing element assembly comprises a component having a shape selected from among a hemisphere, a ball, a disc, a half-cone, a cone, a double cone, a bipyramid, a flat bar with recesses, while the first and second half-seats of the first and the second portions, respectively, have a shape complementary with the lock such that the lock is rotatable and/or movable substantially freely in the seat of the locking mechanism assembly.

17. A flexible towing device for single-track vehicles according to claim 15, wherein the first and the second portions of the body of the locking mechanism assembly are each shaped like a teaspoon and comprises a half-seat in the form of a recess, wherein the first and the second portions of the body each comprises a protrusion arranged substantially along the longitudinal axis of the locking mechanism assembly and configured to assure the first release force applied substantially along said longitudinal axis having a maximum value, and an arched notch arranged substantially along the lateral axis and configured to assure the second release force applied substantially along said lateral axis having a minimum value.

18. A flexible towing device for single-track vehicles according to claim 17, wherein each notch of the locking mechanism assembly is arranged independently so that an angle between the lateral axis and the longitudinal axis is in the range from 0° to 80°.

* * * * *